H. E. EDDY & E. B. CROCKER.
MICROMETER GAGE.
APPLICATION FILED MAY 11, 1911.

1,027,827.

Patented May 28, 1912.

2 SHEETS—SHEET 1.

WITNESSES
C. H. Walker
Newton P. Willis

INVENTORS
Howard E. Eddy,
E. B. Crocker,
by Watson & Boyden, Attorneys.

H. E. EDDY & E. B. CROCKER.
MICROMETER GAGE.
APPLICATION FILED MAY 11, 1911.
1,027,827.
Patented May 28, 1912.
2 SHEETS—SHEET 2.
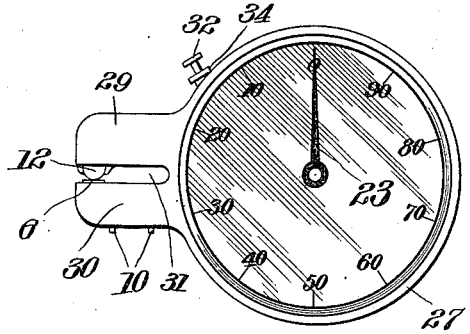
Fig. 4.
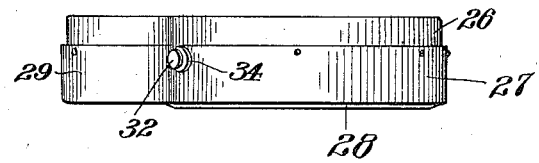
Fig. 5.
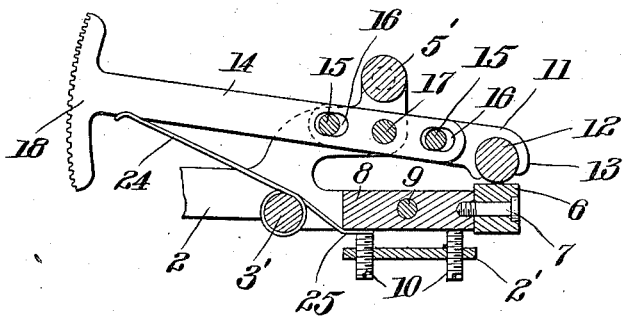
Fig. 6.
Fig. 7.
Fig. 8.
WITNESSES
C. M. Walker
Newton P. Willis
INVENTORS
Howard E. Eddy
E. B. Crocker
by Watson & Boyden
Attorneys
COLUMBIA PLANOGRAPH CO., WASHINGTON, D. C.

UNITED STATES PATENT OFFICE.

HOWARD E. EDDY, OF ARLINGTON, MARYLAND, AND ERNEST B. CROCKER, OF BRIDGEPORT, CONNECTICUT.

MICROMETER-GAGE.

1,027,827.  Specification of Letters Patent.  Patented May 28, 1912.

Application filed May 11, 1911. Serial No. 626,506.

*To all whom it may concern:*

Be it known that we, HOWARD E. EDDY and ERNEST B. CROCKER, citizens of the United States, residing, respectively, at Arlington, in the county of Baltimore and State of Maryland, and Bridgeport, in the county of Fairfield and State of Connecticut, have invented certain new and useful Improvements in Micrometer-Gages, of which the following is a specification.

This invention relates to measuring instruments, and more particularly to gages for measuring thickness, especially such as are designed for use in connection with paper, leather and other sheet material.

As distinguished from the micrometer of the usual or screw type, our improved instrument comprises a pointer movable over a dial from which the measurements may be read directly. Attempts have heretofore been made to produce gages of the dial type, but, so far as we are aware, such instruments have failed to meet the requirements as to accuracy, reliability, compactness, etc., met with in certain classes of work, and hence have not achieved general commercial success.

The primary object of the present invention is to provide an improved gage of the dial type which, as to accuracy, reliability and compactness will compare favorably with the best screw micrometers on the market, and which, as regards simplicity of operation and ease of reading will be vastly superior to such micrometers.

To this end, we have designed certain improvements in the construction and arrangement of the parts, which will hereinafter more fully appear.

In order that the invention may be fully understood, reference is had to the accompanying drawings, forming part of this specification, and in which:—

Figure 1:
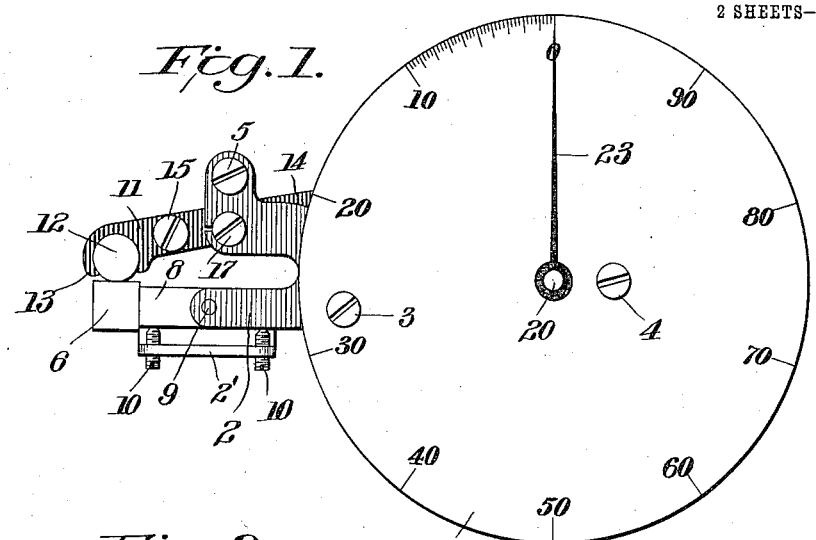
Figure 2:
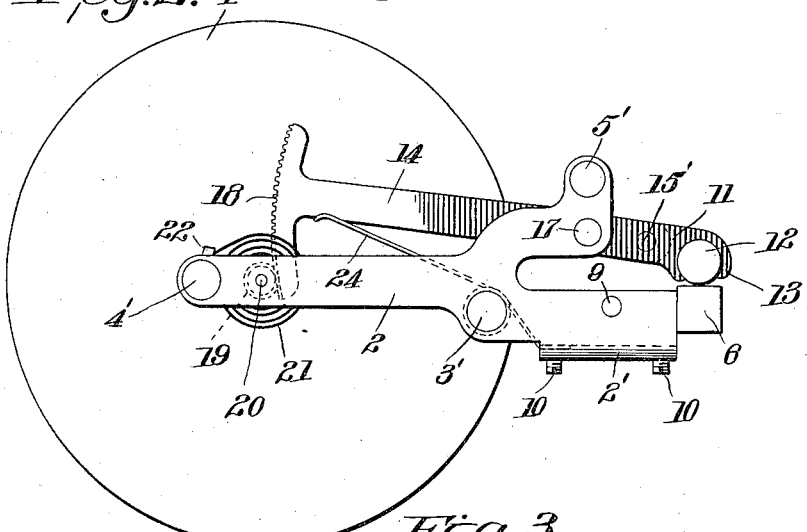
Figure 3:
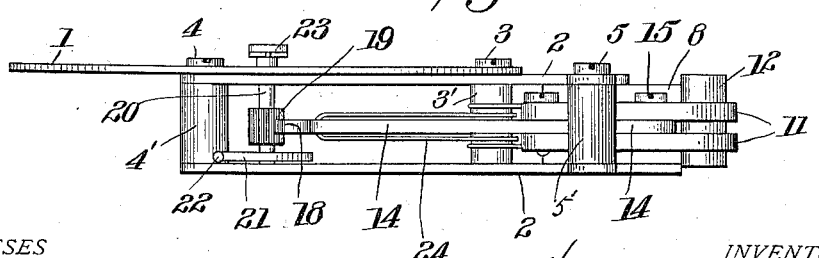

Figure 1 is a front elevation of our improved micrometer gage with the casing removed; Fig. 2 is a rear view thereof; Fig. 3 is an edge view thereof; Fig. 4 is a front elevation of the complete device as it appears when in use; Fig. 5 is an edge view thereof; and, Figs. 6, 7 and 8 are enlarged detail views of parts of the operating mechanism.

The device comprises a flat circular dial 1 which is preferably made of sheet metal. To the rear of this dial, by means of screws 3 and 4, is secured a frame 2 which, as will be clearly seen by reference to Fig. 3, consists of two similar members spaced apart by means of studs or rivets 3', 4' and 5' into which the screws 3, 4 and 5 respectively enter. One of the most important features of the present invention resides in the construction and arrangement of the contact members or devices between which the article to be measured is inserted. On the construction of these members largely depends the accuracy of the gage. As shown in the drawings, one of these members consists of the anvil 6 which is shown as a rectangular block preferably formed of steel. This block is freely pivoted on a centrally extending screw 7 Figs. 6 and 7 to a block 8, which, in turn, is pivoted on a screw 9 which is supported in the frame 2 and which extends at substantially right angles to the screw 7. Stud screws 10, working in an extension 2' of the frame, bear against the under side of the member 8 at each side of the pivot 9. The purpose of these screws will be hereinafter explained. The other contact member or presser foot of our improved device consists of a cylinder 12, preferably formed of steel, the side of which is adapted to contact with the top of the anvil 6. This cylinder is of a length several times greater than its diameter and is secured by means of talons 13 to a pair of spaced members 11 which, together with the member 14, constitutes a pivoted lever. This lever is pivotally supported in the frame 2 by means of a screw or pin 17. The parts 11 and 14 of the lever are secured together by means of a pin and slot connection Fig. 6. As shown in the drawings, slots 16 are formed in the member 14, and screws 15 project through these slots and through the member 11. By reference to Figs. 3 and 7 it will be seen that the member 11 comprises two similar elements between which the part 14 is received. The end of lever 14 is provided with an arc-shaped rack 18 which is adapted to mesh with a pinion 19 fast on a shaft 20 journaled in the frame 2 and projecting through the dial 1. At the rear of the shaft 20 is arranged a spiral spring 21, one end of which is secured to the frame as by means of a pin 22. The front end of the shaft 20 carries the pointer 23, which is movable over the scale of the dial.

A spring 24, preferably formed of resilient wire, bears under the lever 14 and is coiled around the stud 3' while its other end engages under the block 8 as indicated at 25 in Fig. 6. This spring serves to hold the parts in the position shown in the drawing with the contact members 6 and 12 in engagement, and the pointer at zero. The light spiral spring 21 is for the purpose of more accurately positioning the pointer at zero and taking up any lost motion which might exist between the teeth of the rack and pinion.

In practice we propose to inclose the mechanism so far described in a casing. Such casing is shown in Figs. 4 and 5, and preferably consists of front and back sections 27 and 26, to the former of which is secured a glass crystal 28 through which indications of the pointer may be read. The casing is formed with a hood inclosing the operating mechanism and consisting of the two parts 29 and 30, having between them a slot 31 for the reception of the edge of the sheet to be measured. By reference to Fig. 4 it will be seen that the hood 29, 30, incloses and protects the entire mechanism and prevents the contact surfaces of the members 6 and 12 from becoming scratched or worn, the slot 31 being only wide enough to receive the article to be measured.

In order to facilitate the insertion of the sheet between the contact devices we preferably provide means for raising the presser foot 12. This may be accomplished by means of a push button 32 Fig. 8 carried by a plunger 33 extending through a suitable bushing 34 and bearing upon the lever 14. It is obvious that by depressing this plunger the lever will be rocked upon its pivot 17, and the presser foot 12 lifted from the anvil. The sheet to be measured may then be readily inserted, and when the plunger is released the spring 24 will move the presser foot into snug engagement with the surface of the sheet.

It will be observed that by means of the adjusting screws 10 the anvil 6 may be moved slightly up or down and thus the pointer 23 accurately adjusted to zero. It will also be observed that the mounting of the anvil 6 upon the pivot 7 renders it self centering or self leveling and permits it to adapt itself to the presser foot and thus insures a flat engagement between the parts throughout the length of the contact surfaces.

It has heretofore been proposed to employ contact rollers in devices of this character, but it has been found that the lost motion incident to the bearings of such rollers very seriously interferes with the accuracy of the gage. It has also been proposed to use narrow or rounded contact members, but for many substances, such, for instance, as paper, such an arrangement is entirely unsatisfactory. It is necessary to provide an extended bearing for the contact device on the sheet being measured in order to insure accuracy since material such as paper is likely to vary slightly from point to point and unless an extended bearing surface is provided accurate results cannot be obtained. We have therefore designed our improved presser foot 12 which is cylindrical, and is extended axially in a direction parallel with the surface of the anvil.

It sometimes becomes necessary or desirable to vary slightly the ratio between the movement of the presser foot and that of the pointer, and to this end we have provided the adjustable pin and slot connection between the parts 11 and 14. This permits of a slight alteration in the effective length of the lever carrying the presser foot, and such alteration of course proportionately changes the throw of the pointer.

The mounting of the lever 14 in a plane parallel with the dial and securing it thereto renders the device exceedingly compact. In practice it will be about the size of an ordinary watch, and may be readily carried in the pocket.

Extreme accuracy is possible with our improved gage. As indicated in Fig. 1 we propose to divide the dial into a hundred equal parts, representing thousandths of an inch of pressure foot movement. Each of these divisions may readily be divided into four parts, thus making the dial read directly to within one four thousandths of an inch.

It will thus be seen that we have provided an extremely accurate, simple, compact and convenient dial gage which readily lends itself to a large variety of uses, and it is thought that the many advantages of our improved device will be readily appreciated by those familiar with the requirements of such instruments.

What we claim is:—

1. In a micrometer gage, a frame, a pair of contact devices comprising a movable presser foot and a flat, non-rotary anvil, said anvil being adjustably supported on said frame by means of a pair of pivots having their axes substantially at right angles to each other.

2. In a micrometer gage, a frame, a pair of contact devices comprising a movable presser foot, and a flat, non-rotary anvil, a member to which said anvil is pivotally secured, and means for pivotally supporting said member on said frame, the axes of such pivots lying substantially at right angles to each other.

3. In a micrometer gage, a frame, a pair of contact devices comprising a movable presser foot, and an anvil, a member to which said anvil is pivotally secured, means for pivotally supporting said member on said frame and means for angularly adjusting said member and for maintaining the same in adjusted position.

4. In a micrometer gage, a frame, a pair of contact devices comprising a movable presser foot, and an anvil, a member to which said anvil is pivotally secured, means for pivotally supporting said member on said frame, and stop screws set into said frame and bearing against such member one on each side of its pivot, whereby the same may be adjusted.

5. In a micrometer gage, a pair of contact members having opposing, respectively flat and curved measuring surfaces, a support to which that member having the curved surface is rigidly secured, said member being mounted for movement toward and away from the other, and being extended axially in a direction at right angles to the line of such movement, and said flat member being pivoted for movement in a plane parallel with the axis of such curved surface.

6. In a micrometer gage, an anvil having a flat surface, and a presser foot coöperating therewith, such presser foot comprising a cylindrical member the side of which is adapted to be brought into contact with the flat surface of said anvil, and a pivoted lever to which said cylindrical member is rigidly secured, said anvil being itself pivoted on an axis at right angles to the axis of said cylindrical member.

7. In a dial gage, a pointer, a pivoted lever operatively connected at one end with said pointer for actuating the same, a contact member carried by the other end of said lever, said lever having means whereby the effective length thereof may be adjusted, and whereby the ratio of movement between said pointer and contact member may be varied, and means for clamping the parts in adjusted position.

8. In a micrometer gage, a flat dial, a pointer movable thereover, a frame secured to said dial, said frame extending parallel with said dial and projecting beyond the edge thereof, a block pivoted to such projecting portion of the frame, an anvil pivotally mounted on said block, a presser foot adapted to coöperate with said anvil, a pivoted lever connected at one end with said pointer, and to the other end of which said presser foot is attached, and a casing inclosing all of said parts, and having an opening adjacent the said anvil.

In testimony whereof we affix our signatures, in presence of two witnesses.

HOWARD E. EDDY.
ERNEST B. CROCKER.

Witnesses:
  ARTHUR OAKLEY,
  ARTHUR E. PITT.

---

Copies of this patent may be obtained for five cents each, by addressing the "Commissioner of Patents, Washington, D. C."